United States Patent
Lee et al.

(10) Patent No.: US 8,734,989 B2
(45) Date of Patent: *May 27, 2014

(54) NEGATIVE ELECTRODE FOR RECHARGEABLE LITHIUM BATTERY AND RECHARGEABLE LITHIUM BATTERY INCLUDING THE SAME

(75) Inventors: Sang-Min Lee, Suwon-si (KR); Nam-Soon Choi, Suwon-si (KR); Goo-Jin Jeong, Suwon-si (KR); Yong-Mook Kang, Suwon-si (KR); Min-Seok Sung, Suwon-si (KR); Wan-Uk Choi, Suwon-si (KR); Sung-Soo Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/324,952

(22) Filed: Nov. 28, 2008

(65) Prior Publication Data

US 2009/0136846 A1 May 28, 2009

(30) Foreign Application Priority Data

Nov. 28, 2007 (KR) .................. 10-2007-0122156

(51) Int. Cl.
*H01M 4/62* (2006.01)

(52) U.S. Cl.
USPC ........... 429/217; 429/233; 429/235; 429/246; 429/231.95; 429/231.5; 429/229; 429/231.9; 429/219; 429/222

(58) Field of Classification Search
USPC ......... 429/233, 235, 246, 231.95, 231.5, 229, 429/231.9, 219, 222, 217
See application file for complete search history.

(56) References Cited

U.S. PATENT DOCUMENTS

| | | | |
|---|---|---|---|
| 7,553,587 B2 | 6/2009 | Watanabe | |
| 7,638,243 B2 | 12/2009 | Xu et al. | |
| 7,754,390 B2 | 7/2010 | Takezawa et al. | |
| 2005/0244711 A1 | 11/2005 | Fukui et al. | |
| 2006/0263688 A1 | 11/2006 | Guyomard et al. | |
| 2007/0072083 A1* | 3/2007 | Ikuta et al. | 429/246 |
| 2007/0128517 A1 | 6/2007 | Christensen et al. | |
| 2007/0148544 A1 | 6/2007 | Le | |

(Continued)

FOREIGN PATENT DOCUMENTS

| | | |
|---|---|---|
| CN | 1663065 A | 8/2005 |
| EP | 1 947 714 A1 | 7/2008 |

(Continued)

OTHER PUBLICATIONS

Extended European Search Report dated Feb. 25, 2009, in corresponding European Patent Application No. 08169976.1.

(Continued)

*Primary Examiner* — Laura S Weiner
(74) *Attorney, Agent, or Firm* — Christie, Parker & Hale, LLP

(57) ABSTRACT

A negative electrode for rechargeable lithium batteries includes a current collector, a porous active material layer having a metal-based active material disposed on the current collector, and a high-strength binder layer on the porous active material layer. The high-strength binder layer has a strength ranging from 5 to 70 MPa. The negative active material for a rechargeable lithium battery according to the present invention can improve cycle-life characteristics by suppressing volume expansion and reactions of an electrolyte at the electrode surface.

30 Claims, 3 Drawing Sheets

(56) References Cited

U.S. PATENT DOCUMENTS

| | | | |
|---|---|---|---|
| 2007/0190407 A1 | 8/2007 | Fujikawa et al. | |
| 2007/0196738 A1 | 8/2007 | Ohata et al. | |
| 2009/0087748 A1* | 4/2009 | Choi et al. | 429/231.5 |

FOREIGN PATENT DOCUMENTS

| | | |
|---|---|---|
| FR | 2 852 148 A1 | 9/2004 |
| JP | 07-220759 | 8/1995 |
| JP | 2005-026203 | 1/2005 |
| JP | 2006-032325 | 2/2006 |
| JP | 2007-220321 | 8/2007 |
| JP | 4053576 B2 | 2/2008 |
| JP | 2008-053206 | 3/2008 |
| JP | 2008-135382 | 6/2008 |
| JP | 2008-270160 | 11/2008 |
| JP | 4667242 B2 | 4/2011 |
| KR | 10-2005-0027224 A | 3/2005 |
| KR | 10-2006-0030898 | 4/2006 |
| KR | 10-2007-0030487 | 3/2007 |
| KR | 10-0721500 | 5/2007 |
| WO | WO 02/061872 A1 | 8/2002 |
| WO | WO 2007/094641 A1 | 8/2007 |

OTHER PUBLICATIONS

Winter et al., "Insertion Electrode Materials for Rechargeable Lithium Batteries," Advanced Materials, Wiley VCH, Weinheim, DE, vol. 10, No. 10, Jan. 1998, XP002947071, pp. 725-763.

KIPO Office action dated Feb. 26, 2010, for Korean application 10-2008-0015839, priority to related U.S. Appl. No. 12/182,013.

U.S. Office action dated Feb. 2, 2010, for related U.S. Appl. No. 12/182,013.

Zhang, S.S., et al., *Enhanced performance of natural graphite in Li-ion battery by oxalatoborate coating*, Journal of Power Sources, vol. 129, (2004), pp. 275-279.

U.S. Office action dated Jun. 25, 2010, for related U.S. Appl. No. 12/182,013.

Office action dated Oct. 8, 2010 for related U.S. Appl. No. 12/182,013.

English translation of FR 2 852 148 A1, listed above.

SIPO Office action dated Nov. 19, 2010 in corresponding Chinese patent application No. 200810180727.7 with English translation, listing US 2007/0190407.

KIPO Notice of Allowance dated Aug. 26, 2010, for Korean Patent application 10-2008-0015839, noting listed references in this IDS, as well as references previously filed in an Ids dated Apr. 8, 2010.

Korean Patent Abstracts for Korean Publication 1020050114698, dated Dec. 6, 2005, corresponding to Korean Patent 10-0721500 listed above.

SIPO Office action dated Jun. 7, 2011, for corresponding Chinese Patent application 200810180727.7, with English translation, 7 pages.

U.S. Notice of Allowance dated May 5, 2011, for cross reference U.S. Appl. 12/182,013.

U.S. Office action dated Nov. 14, 2011, for cross reference U.S. Appl. No. 13/236,373, 9 pages.

U.S. Office action dated Dec. 12, 2011, for U.S. cross reference U.S. Appl. No. 13/236,373, 8 pages.

U.S. Office action dated Jan. 20, 2011 issued in U.S. Appl. No. 12/182,013, 8 pages.

Japanese Office action dated Mar. 6, 2012, for corresponding Japanese Patent application 2008-302319, 2 pages.

Patent Abstracts of Japan, and English machine translation of Japanese Publication 2007-220321, 18 pages.

U.S. Notice of Allowance dated Mar. 16, 2012 issued in U.S. Appl. No. 12/182,013, 8 pages.

U.S. Notice of Allowance dated Mar. 12, 2012 issued in U.S. Appl. No. 12/236,373, 7 pages.

U.S. Notice of Allowance dated Apr. 24, 2013, for cross reference U.S. Appl. No. 12/182,013, (9 pages).

U.S. Office action dated Apr. 26, 2013, for cross reference U.S. Appl. No. 12/236,373, (7 pages).

English machine translation of Japanese Publication 2008-135382, dated, listed above (60 pages).

U.S. Notice of Allowance dated Aug. 2, 2013, for cross reference U.S. Appl. No. 13/236,373, (9 pages).

\* cited by examiner

NEGATIVE ELECTRODE FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2007-0122156, filed in the Korean Intellectual Property Office on Nov. 28, 2007, the entire content of which is incorporated in its entirety herein by reference.

BACKGROUND OF THE INVENTION

1. Field of the Invention

The present invention relates to negative electrodes for rechargeable lithium batteries and rechargeable lithium batteries including the same.

2. Description of the Related Art

Lithium rechargeable batteries have recently drawn attention as power sources for small portable electronic devices. These batteries use organic electrolyte solutions that have discharge voltages twice as high as conventional batteries that use alkali aqueous solutions. Accordingly, lithium rechargeable batteries have high energy densities.

Lithium-transition element composite oxides capable of intercalating lithium, such as $LiCoO_2$, $LiMn_2O_4$, $LiNiO_2$, $LiNi_{1-x}Co_xO_2$ (0<x<1), and so on, have been researched for use as positive active materials for lithium rechargeable batteries.

Carbon-based materials, such as artificial graphite, natural graphite, and hard carbon, all of which can all intercalate and deintercalate lithium ions, have been used as negative active materials. The use of graphite tends to increase discharge voltage and energy densities because graphite has a low discharge potential of −0.2V compared to lithium. Batteries using graphite as the negative active material have high average discharge potential of 3.6V and excellent energy densities. Furthermore, graphite is the most comprehensively used among the aforementioned carbon-based materials because graphite imparts better cycle-life due to its outstanding reversibility. However, when used as negative active materials, graphite active materials have low densities and consequently low capacity in terms of energy density per unit volume. Further, because graphite is likely to react with the organic electrolyte at high discharge voltages, there are some dangers such as explosion or combustion when a battery is misused, overcharged, or the like.

To address these problems, research in metal oxide negative electrodes including tin oxide, or lithium vanadium oxide, has recently been performed. For example, amorphous tin oxide, which has high capacity per weight (i.e. 800 mAh/g), has been suggested as an alternative. However, amorphous tin oxide has a high initial irreversible capacity up to 50%. Furthermore, tin oxide has a tendency to reduce to tin metal during the charge or discharge cycle, thereby rendering it disadvantageous for use in batteries.

In another metal oxide negative electrode, $Li_aMg_bVO_c$ (0.05≤a≤3, 0.12≤b≤2, and 2≤2c-a-2b≤5) has been used as a negative active material. However, such metal oxide negative electrode does not impart sufficient battery performance and therefore further research into metal oxide negative materials has been conducted.

SUMMARY OF THE INVENTION

One embodiment of the present invention provides a negative active material for rechargeable lithium batteries that has improved cycle-life characteristics by suppressing volume expansion and reactions of the electrolyte at the electrode surface.

Another embodiment of the present invention provides a rechargeable lithium battery that includes the negative electrode.

According to one embodiment of the present invention, the negative electrode for rechargeable lithium batteries includes a current collector, a porous active material layer having a metal-based active material disposed on the current collector, and a high-strength binder layer on the porous active material layer. In one embodiment, the high-strength binder layer has a mechanical strength ranging from 5 to 70 MPa.

According to another embodiment of the present invention, there is provided a rechargeable lithium battery with a negative electrode having the negative active material.

The negative active materials can improve cycle-life characteristics by suppressing volume expansion and reactions of the electrolyte at the electrode surface.

BRIEF DESCRIPTION OF THE DRAWINGS

The above and other features of the present invention will become more apparent by reference to the following detailed description when considered in conjunction with the attached drawings, in which.

DETAILED DESCRIPTION OF THE INVENTION

Typical rechargeable lithium batteries have electrodes made of an active material that contracts and expands during the charge and discharge cycle. Batteries that have a metallic-alloy-based or silicon-based negative active material exhibit high volume change. This volume change deteriorates the cycle-life characteristics of rechargeable lithium batteries.

Therefore, the present invention provides a battery that has improved cycle-life characteristics by having a high-strength binder layer on the active material layer to reduce the expansion rate of the electrode. In addition, the present invention provides a battery that can suppress reactions of the electrolyte at the surface of the electrode since the binder layer can facilitate the movement of the active material particles in the active material layer to the surface.

Figure 1:
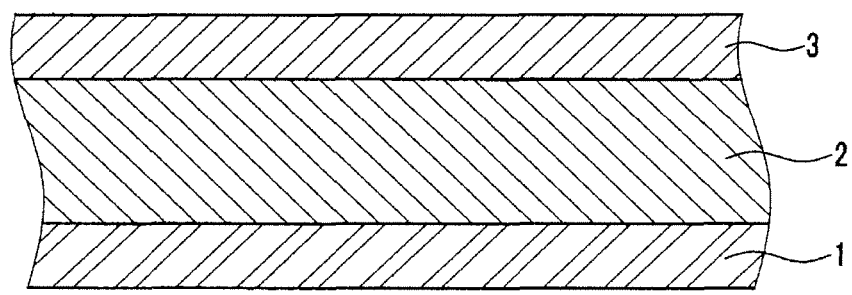
FIG. 1 is a schematic cross-sectional view showing a negative electrode of a lithium rechargeable battery according to one embodiment of the present invention.

FIG. 1 is a schematic cross-sectional view of a negative electrode of a lithium rechargeable battery according to one embodiment of the present invention.

Referring to FIG. 1, the negative electrode 112 includes a current collector 1, a porous active material layer 2 disposed on the current collector 1, and a high-strength binder layer 3 disposed on the porous active material layer 2.

The current collector 1 may include copper foils, nickel foils, stainless steel foils, titanium foils, nickel foam, copper foam, or polymer materials coated with conductive metals.

The active material layer 2 includes a negative active material, a binder, and optionally a conductive material and a pore-forming agent.

The negative active material is a metal-based active material that includes lithium metal, metals capable of alloying with lithium, or mixtures thereof. The metal that can alloy with lithium may include Na, K, Rb, Cs, Fr, Be, Mg, Ca, Sr, Ba, Ra, Ti, Ag, Zn, Cd, Al, Ga, In, Si, Ge, Sn, Pb, Sb, Bi, or combinations thereof.

In one embodiment, the negative active material is present in an amount from 1 to 99 wt % based on the total weight of the negative active material layer. In another embodiment, the negative active material is present in an amount from 10 to 98 wt % based on the total weight of the negative active material layer. When the amount of the negative active material is outside of the above specified range, the capacity may deteriorate, or the relative amount of binder is reduced thereby reducing the adhesion properties between the negative active material layer and a current collector.

The binder improves adhesion between the particles of the negative active material, and adhesion between the negative active material and a current collector. Examples of suitable binders include, but are not limited to, polyvinyl alcohol, carboxylmethyl cellulose, hydroxypropyl cellulose, diacetyl cellulose, polyvinylchloride, carboxylated polyvinylchloride, polyvinyldifluoride, an ethylene oxide-containing polymer, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, and nylon.

The binder may be included in an amount from 1 to 20 wt % based on the total weight of the negative active material layer. In one embodiment, the binder is present in an amount from 2 to 10 wt % based on the total weight of the negative active material layer. When the amount of the binder is less than 1 wt %, sufficient adhesion cannot be obtained. When the amount of the binder is more than 20 wt %, the capacity may deteriorate.

The negative active material layer may further include a conductive material to improve electrical conductivity of the negative electrode and to act as a lubricant between the active material particles, which can result in improvements of the electrode expansion and cycle-life characteristics.

Any electrically conductive material can be used so long as it does not cause a chemical change. Nonlimiting examples of conductive materials include natural graphite, artificial graphite, carbon black, acetylene black, ketjen black, polyphenylene derivatives, carbon fibers, metal powders or metal fibers including copper, nickel, aluminum, and silver.

The conductive material may be provided in any one or more or various shapes, such as particles, flakes, and fibers, but the shape is not limited thereto.

The conductive material may be included in an amount from 1 to 20 wt % based on the total weight of the negative active material layer. In one embodiment, the conductive material may be included in an amount from 1 to 10 wt % based on the total weight of the negative active material layer. When the amount of the conductive material is more than 20 wt %, the electrode energy density may deteriorate.

In one embodiment, the negative active material layer 2 includes pores. The pores in the negative active material layer can be formed by any known conventional methods. When the pores are formed using a pore-forming agent, they can have various sizes, distribution, and porosity depending on the size, amount, and treatment of the pore-forming agent. According to some conventional manufacturing methods, the negative active material layer includes a pore-forming agent that does not evaporate but rather remains in the negative active material layer.

The negative active material layer 2 may have a porosity ranging from 30 to 70 volume %. In another embodiment, it may have a porosity ranging from 40 to 60 volume %. When the porosity is less than 30%, the volume expansion of the electrode may not be efficiently suppressed. When the porosity is more than 70%, the energy density may deteriorate.

The high-strength binder layer 3 is disposed on the porous negative active material layer 2. In one embodiment, the high-strength binder layer 3 includes a high-strength binder and a filler.

In one embodiment, the high-strength binder has a low-melting point. This allows the high-strength binder to crystallize at low temperatures, resulting in a material with high mechanical strength.

The high-strength binder may have a crystallinity degree ranging from 10% to 70%. In one embodiment, the high-strength binder has a crystallinity degree ranging from 30% to 50%. As described throughout the specification, the crystallinity degree is the weight percentage of the crystalline portion based on the entire weight of a polymer. When the high-strength binder has a crystallinity degree less than 10%, the polymer chain may not be sufficiently packed or ordered, thereby resulting in a binder with weak mechanical strength. When the crystallinity degree is more than 70%, the mobility of lithium ions may decrease, which may lead to an increase in battery resistance.

The high-strength binder may have a glass transition temperature (Tg) ranging from $-100°$ C. to $100°$ C. In one embodiment, the high-strength binder may have a glass transition temperature (Tg) ranging from $-80°$ C. to $30°$ C. When the glass transition temperature is less than $-100°$ C., the structure of the high-strength binder may be distorted or transformed because of the infiltration of the electrolyte solution into voids in an amorphous area. When the high-strength binder has a glass transition temperature that is more than $100°$ C., the mobility of lithium ions in the amorphous area may decrease, and thereby increase the battery resistance.

The high-strength binder may include acrylate-based polymers, vinyl-based polymers, fluoro-based polymers, imide-based polymers, cellulose-based polymers, amide-imide-based polymers, sulfone-based polymers, alkyleneoxide-based polymers, and copolymers thereof. Specific examples of suitable high-strength binders include, but are not limited to, polyvinylchloride, polyvinylidene fluoride, polyvinylidene fluoride-hexafluoropropylene copolymers, polyvinyl alcohol, polyimide, carboxylmethyl cellulose, and mixtures thereof.

The high-strength binder layer may further include an acryl-based binder, which may be used to improve the electrolyte's affinity for lithium ions, thereby resulting in an increase in lithium ion conductivity when the electrolyte is absorbed in the high-strength binder layer.

The acryl-based binder may include a poly(alkyl(meth) acrylate-co-alkyl(meth)acrylate), such as poly(methylmethacrylate-co-butylmethacrylate) (poly(MMA-co-BMA)).

The acryl-based binder may be included in an amount from 50 to 300 parts by weight based on 100 parts by weight of a high-strength binder. In one embodiment, the acryl-based binder may be included in an amount from 100 to 200 parts by weight. When the acryl-based binder is included in an amount less than 50 parts by weight, a high-strength binder layer may have decreased electrolyte affinity for lithium ions. When the acryl-based binder is included in an amount more than 300 parts by weight, the mechanical strength of the high-strength binder layer may decrease.

In one embodiment, the filler increases the mechanical strength of a high-strength binder layer. The filler and may include an inorganic material particulate, such as alumina, silica, zirconia, titania, or the like.

The filler may be provided in different shapes, such as plate, spherical, or fiber-like shapes. In one embodiment, the filler has an average particle size ranging from 5 nm to 500 nm. In another embodiment, the filler has an average particle size ranging from 10 nm to 200 nm. When the filler has an average particle size less than 5 nm, the mechanical properties of the solid electrolyte membrane may deteriorate. When the filler has an average particle size more than 500 nm, the solid electrolyte membrane may not be sufficiently dense.

The filler may be included in an amount from 10 to 90 parts by weight based on 100 parts by weight of a high-strength binder. In one embodiment, the filler may be included in an amount from 30 to 70 parts by weight. When the filler is included in an amount less than 10 parts by weight, the mechanical property of the high-strength binder layer may deteriorate. When the filler is included in an amount more than 90 parts by weight, the electrical resistance of the high-strength binder layer may increase, which may subsequently lead to an increase in battery resistance.

The high-strength binder layer may further include a lithium salt to improve the battery resistance when operating at high discharge rates.

Nonlimiting examples of lithium salts include $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_2$, $LiAlCl_4$, $LiN(C_pF_{2p+1}SO_2)(C_qF_{2q+1}SO_2)$ (where p and q are natural numbers), $LiSO_3CF_3$, LiCl, LiI, lithium bisoxalate borate, and mixtures thereof. In one embodiment, $LiBF_4$, lithium bisoxalate borate, lithium imide-based compounds, and mixtures thereof are preferred.

The lithium salt may be included in an amount from 1 to 50 wt % based on the total weight of a high-strength binder layer. In another embodiment, it may be included in an amount from 5 to 20 wt %. When the lithium salt is included in an amount less than 1 wt %, the ion conductivity of a solid electrolyte membrane may decrease. When the lithium salt is included more than 50 wt %, the viscosity of the solid electrolyte membrane may increase, thereby decreasing the mobility of the lithium ions.

According to an embodiment of the present invention, a high-strength binder layer with the above composition may have a thickness ranging from 1 to 20 μm. In another embodiment, the binder layer may have a thickness ranging from 2 to 10 μm. When the thickness of the binder layer is less than 1 μm, the mechanical strength of the solid electrolyte membrane may deteriorate. When the thickness of the binder layer is more than 20 μm, both ion conductivity and electrical conductivity of an electrode may deteriorate.

The high-strength binder layer may have a mechanical strength ranging from 5 to 70 MPa. In one embodiment, the high-strength binder layer may have a mechanical strength ranging from 20 to 60 MPa. When the mechanical strength is less than 5 MPa, the high-strength binder layer is not effective in suppressing volume expansion of the active material in the active material layer. When the mechanical strength is more than 70 MPa, the electrode may become too rigid to form into a jelly-roll shape.

The negative electrode is provided by mixing a negative active material, a binder, and optionally a conductive material and/or a pore-forming agent in a solvent to provide a composition for a negative active material layer; coating the composition on a current collector to provide a negative active material layer; mixing a high-strength binder, a filler, and optionally a lithium salt and/or an acryl-based polymer in a solvent to produce a composition for a high-strength binder layer; and coating the composition for a high-strength binder layer on the negative active material layer and then drying to provide a high-strength binder layer.

In one embodiment, the composition of a negative active material layer is prepared by mixing a metal-based negative active material, a binder, and optionally a conductive material and/or a pore-forming agent in a solvent.

The negative active material, the binder, and the conductive material are the same as aforementioned.

When the negative active material layer includes pores formed by using a pore-forming agent, any type of agent can be used. Nonlimiting examples of suitable pore-forming agents include $(NH_4)_2CO_3$, $NH_4HCO_3$, $(NH_4)_2C_2O_4$, and mixtures thereof, which can be removed by heat-treatment, thereby leaving voids or pores in the active material.

The composition for the negative active material may include a polymer material, such as poly(alkylenecarbonate), poly(alkyleneoxide), poly(dialkylsiloxane), an acrylate-based polymer, or the like, which can be dissolved in a non-aqueous organic solvent. In one embodiment, the alkylene group includes 2 to 20 carbons. In another embodiment, the alkylene group includes 2 to 10 carbons. In one embodiment, the alkyl group includes 1 to 20 carbons. In yet another embodiment, the alkyl group includes 1 to 10 carbons. Alternatively, the composition for the negative active material may further include an alkali-metal-containing carbonate salt, such as $Li_2CO_3$, $K_2CO_3$, $Na_2CO_3$, and the like, which can be dissolved in acids.

The pore-forming agent can be appropriately added in various amounts depending on the desired porosity in an active material layer.

The solvent may include tetrahydrofuran, N-methylpyrrolidone, or the like, but is not limited thereto.

After the composition for forming an active material layer is coated on a current collector, the coated current collector is allowed to dry to form a negative active material layer.

Examples of suitable coating processes include, but are not limited to, screen printing, spray coating, coating with a doctor blade, gravure coating, dip coating, silk screening, painting, and slot-die methods. Any of these methods can be used and is often selected based on the viscosity of the active material layer composition.

Nonlimiting examples of suitable drying process include commonly known methods, such as natural drying, hot air drying, and the like.

After the active material layer is formed, pores are created. The pore formation process may include a pore-forming agent removal process depending on the kind of pore-forming agent used.

When the pore-forming agent is a type that can be evaporated under high temperatures, heat treatment can be performed at a temperature ranging from 50 to 500° C. to remove the pore-forming agent. In one embodiment, the heat treatment may be performed at a temperature ranging from 100 to 450° C. When the heat treatment is performed at a temperature less than 50° C., the pore-forming agent may not be sufficiently removed. When the heat treatment is performed at a temperature higher than 500° C., the binder may be carbonized, thereby deteriorating the mechanical properties of the electrode.

When the pore-forming agent is a type that can be removed or eluted by a non-aqueous organic solvent or acid, the active material layer is first dried followed by an impregnation of the non-aqueous organic solvent or acid treatment to remove the pore-forming agent.

In one embodiment, the composition for forming a high-strength binder layer is prepared by mixing a high-strength binder, a filler, and optionally a lithium salt and/or acryl-based binder in a solvent. The composition is coated on the negative active material layer and dried to form a high-strength binder layer.

The high-strength binder, filler, lithium salt, acryl-based binder, and solvent may be the same as the aforementioned materials.

The coating process may be any commonly known slurry-coating processes, including those previously described above.

In one embodiment, the drying process can be performed at a temperature ranging from 100 to 500° C. to crystallize the high-strength binder. In another embodiment, the drying process can be performed at a temperature ranging from 120 to 400° C. When the drying process is performed at a temperature lower than 100° C., the high-strength binder may not be sufficiently crystallized and may have deteriorated mechanical strength. When the drying process is performed at a temperature higher than 500° C., the binder can be damaged.

In various embodiments, the negative electrode for a rechargeable lithium battery includes a high-strength binder layer, which improves the cycle-life characteristic of the rechargeable lithium battery. It helps to suppress volume expansion of the porous negative active material layer and reaction of the electrolyte at the electrode surface.

In one embodiment, a rechargeable lithium battery including the negative electrode is provided.

The rechargeable lithium battery includes the negative electrode, a positive electrode having a positive active material that is capable of intercalating and deintercalating lithium ions, and an electrolyte having a non-aqueous organic solvent and a lithium salt.

Rechargeable lithium batteries can be classified as lithium ion batteries, lithium ion polymer batteries, and lithium polymer batteries based on the types of separator and electrolyte used in the battery. The rechargeable lithium batteries may be made in different shapes and sizes. Examples include cylindrical, prismatic, or coin-type batteries. They can also be thin film or bulk-type batteries. Structures and fabricating methods for lithium ion batteries pertaining to the present invention are well-known in the art.

Figure 2:
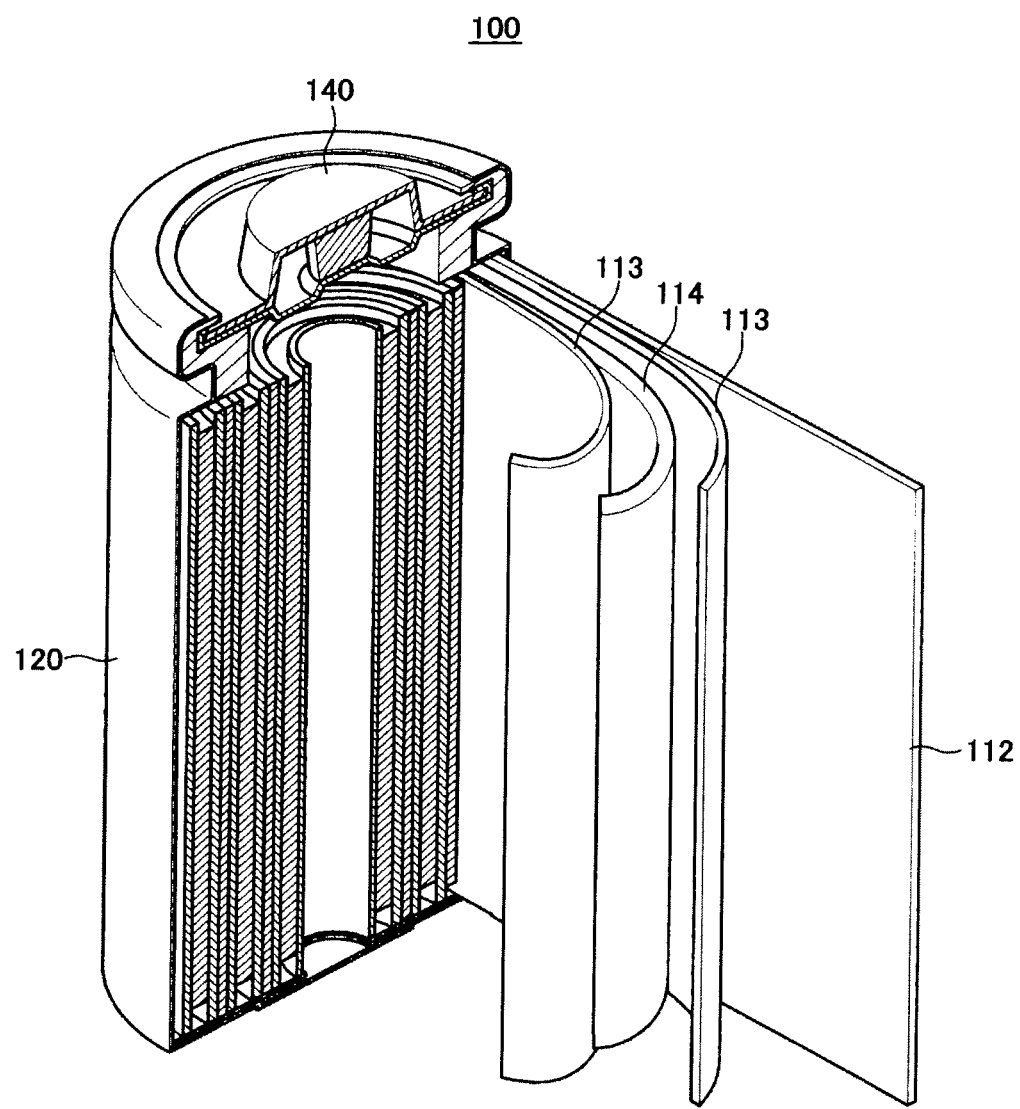
FIG. 2 is a cross-sectional perspective view of a rechargeable lithium battery according to one embodiment of the present invention.

FIG. 2 illustrates a rechargeable lithium battery 100, which includes a negative electrode 112, a positive electrode 114, a separator 113 interposed between the negative electrode 112 and the positive electrode 114, an electrolyte impregnating the separator 113, a battery case 120, and a sealing cap 140 sealing the battery case 120. In another embodiment, the rechargeable lithium battery 100 does not have a separator since the negative electrode 112 includes a high-strength binder layer that acts as a separator.

The negative electrode 112 may be made the same way as the electrode described above.

The positive electrode 114 includes a current collector, and a positive active material layer disposed on the current collector.

The positive active material layer may include a positive active material, for example, a lithiated intercalation compound that is capable of reversibly intercalating and deintercalating lithium ions. Specifically, the positive active material includes compounds of Chemical Formulas 1 to 24.

$$Li_aA_{1-b}B_bD_2 \quad \text{Chemical Formula 1}$$

where, $0.95 \leq a \leq 1.1$ and $0 \leq b \leq 0.5$.

$$Li_aE_{1-b}B_bO_{2-c}F_c \quad \text{Chemical Formula 2}$$

where, $0.95 \leq a \leq 1.1$, $0 \leq b \leq 0.5$, and $0 \leq c \leq 0.05$.

$$LiE_{2-b}B_bO_{4-c}F_c \quad \text{Chemical Formula 3}$$

where, $0 \leq b \leq 0.5$ and $0 \leq c \leq 0.05$.

$$Li_aNi_{1-b-c}Co_bB_cD_d \quad \text{Chemical Formula 4}$$

where, $0.95 \leq a \leq 1.1$, $0 \leq b \leq 0.5$, $0 \leq c \leq 0.05$, and $0 < \alpha \leq 2$.

$$Li_aNi_{1-b-c}Co_bB_cO_{2-\alpha}\alpha \quad \text{Chemical Formula 5}$$

where, $0.95 \leq a \leq 1.1$, $0 \leq b \leq 0.5$, $0 \leq c \leq 0.05$, and $0 < \alpha < 2$.

$$Li_aNi_{1-b-c}Co_bB_cO_{2-\alpha}F_2 \quad \text{Chemical Formula 6}$$

where, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cD_\alpha \quad \text{Chemical Formula 7}$$

where, $0.95 \leq a \leq 1.1$, $0 \leq b \leq 0.5$, $0 \leq c \leq 0.05$, and $0 < \alpha \leq 2$.

$$Li_aNi_{1-b-c}Mn_bB_cO_{2-\alpha}F_\alpha \quad \text{Chemical Formula 8}$$

where, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cO_{2-\alpha}F_2 \quad \text{Chemical Formula 9}$$

where, $0.95 \leq a \leq 1.1$, $0 \leq b \leq 0.5$, $0 \leq c \leq 0.05$, and $0 < \alpha < 2$.

$$Li_aNi_bE_cG_dO_2 \quad \text{Chemical Formula 10}$$

where, $0.90 \leq a \leq 1.1$, $0 \leq b \leq 0.9$, $0 \leq c \leq 0.9$, and $0.001 \leq d \leq 0.1$.

$$Li_aNi_bCo_cMn_dG_eO_2 \quad \text{Chemical Formula 11}$$

where, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_aNiG_bO_2 \quad \text{Chemical Formula 12}$$

where, $0.90 \leq a \leq 1.1$ and $0.001 \leq b \leq 0.1$.

$$Li_aCoG_bO_2 \quad \text{Chemical Formula 13}$$

where, $0.90 \leq a \leq 1.1$ and $0.001 \leq b \leq 0.1$.

$$Li_aMnG_bO_2 \quad \text{Chemical Formula 14}$$

where, $0.90 \leq a \leq 1.1$ and $0.001 \leq b \leq 0.1$.

$$Li_aMn_2G_bO_4 \quad \text{Chemical Formula 15}$$

where, $0.90 \leq a \leq 1.1$ and $0.001 \leq b \leq 0.1$.

$$QO_2 \quad \text{Chemical Formula 16}$$

$$QS_2 \quad \text{Chemical Formula 17}$$

$$LiQS_2 \quad \text{Chemical Formula 18}$$

$$V_2O_5 \quad \text{Chemical Formula 19}$$

$$LiV_2O_5 \quad \text{Chemical Formula 20}$$

$$LiIO_2 \quad \text{Chemical Formula 21}$$

$$LiNiVO_4 \quad \text{Chemical Formula 22}$$

$$Li_{(3-f)}J_2(PO_4)_3 \quad \text{Chemical Formula 23}$$

where, $(0 \leq f \leq 3)$.

$$Li_{(3-f)}Fe_2(PO_4)_3 \quad \text{Chemical Formula 24}$$

where, $(0 \leq f \leq 2)$.

In Chemical Formulas 1 to 24, A is Ni, Co, Mn, or combinations thereof; B is Al, Ni, Co, Mn, Cr, Fe, Mg, Sr, V, rare earth elements, or combinations thereof; D is O, F, S, P, or combinations thereof; E is Co, Mn, or combinations thereof; F is F, S, P, or combinations thereof; G is Al, Cr, Mn, Fe, Mg, Ce, Sr, V, lanthanide such as La, or combinations thereof; Q is Ti, Mo, Mn, or combinations thereof; I is Cr, V, Fe, Sc, Y, or combinations thereof; and J is V, Cr, Mn, Co, Ni, Cu, or combinations thereof.

In one embodiment, the positive active material may include inorganic sulfur ($S_8$, elemental sulfur) and/or a sulfur-based compound. The sulfur-based compound may include $Li_2S_n(n \geq 1)$, $Li_2S_n(n \geq 1)$ dissolved in a catholyte, an organic sulfur compound, a carbon-sulfur polymer (($C_2S_f)_n$: f=2.5 to 50, n≥2), or the like.

In one embodiment, the positive active material includes a coating layer. In another embodiment, the positive active material is a compound of the active materials coated with a coating layer. The coating layer may include a coating element compound and oxides or hydroxides of a coating element, oxyhydroxide, oxycarbonate, or hydroxycarbonate of the coating element. Examples of suitable coating elements include, but are not limited to Mg, Al, Co, K, Na, Ca, Si, Ti, V, Sn, Ge, Ga, B, As, Zr, and combinations thereof. The coating process may be any conventional process as long as it does not cause any side effects to the properties of the positive active material (e.g., spray coating, dipping). Such processes are well known to persons having ordinary skills in the art.

In one embodiment, the positive active material layer further includes a binder and a conductive material.

The binder improves adhesion between the positive active material particles and adhesion to a current collector. Examples of suitable binders include, but are not limited to, polyvinyl alcohol, carboxylmethyl cellulose, hydroxypropyl cellulose, diacetyl cellulose, polyvinylchloride, carboxylated polyvinylchloride, polyvinylfluoride, ethylene-oxide-containing polymers, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, and nylon.

The conductive material improves electrical conductivity of the positive electrode. Any electrically conductive material can be used so long as the conductive agent does not cause a chemical change. Examples of suitable conductive materials include, but are not limited to, natural graphite, artificial graphite, carbon black, acetylene black, ketjen black, polyphenylene derivatives, carbon fibers, metal powder, or metal fibers including copper, nickel, aluminum, and silver.

In one embodiment, the current collector is Al.

The positive electrode may be fabricated by mixing a positive active material, a binder, and a conductive agent to form a positive active material composition, which is then coated on a current collector such as aluminum.

In one embodiment, the electrolyte includes a lithium salt dissolved in a non-aqueous organic solvent.

The lithium salt provides a source of lithium ions, helps facilitating the basic operation of the rechargeable lithium battery, and improves lithium ion transport between the positive and negative electrodes.

Nonlimiting examples of suitable lithium salts include $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_2$, $LiAlCl_4$, $LiN(C_pF_{2p+1}SO_2)(C_qF_{2q+1}SO_2)$ (where p and q are natural numbers), $LiSO_3CF_3$, LiCl, LiI, lithium bisoxalate borate, and mixtures thereof.

The lithium salt may be present at a concentration from 0.1 to 2.0 M. In one embodiment, the lithium salt is present at a concentration from 0.7 to 1.6 M. When the lithium salt concentration is less than 0.1 M, the electrolyte performance may deteriorate due to low electrolyte conductivity. When the lithium salt concentration is more than 2.0 M, the electrolyte viscosity may increase, thereby reducing the lithium ion mobility.

The non-aqueous organic solvent acts as a medium for transporting ions that take place in the electrochemical reaction of the battery. Nonlimiting examples of suitable non-aqueous organic solvents include carbonate-based, ester-based, ether-based, ketone-based, alcohol-based, or aprotic solvents. Nonlimiting examples of suitable carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Nonlimiting examples of suitable ester-based solvents include methyl acetate, ethyl acetate, n-propyl acetate, methylpropionate, ethylpropionate, γ-butyrolactone, decanolide, valerolactone, mevalonolactone, caprolactone, and so on. Nonlimiting examples of suitable ether-based solvents include dibutyl ether, tetraglyme, diglyme, dimethoxyethane, 2-methyltetrahydrofuran, tetrahydrofuran, and so on. Nonlimiting examples of suitable ketone-based solvents include cyclohexanone. Nonlimiting examples of suitable alcohol-based solvents include ethyl alcohol, isopropyl alcohol, and so on. Nonlimiting examples of suitable aprotic solvents include nitriles, such as X—CN (where X is a C2 to C20 linear, branched, or cyclic hydrocarbon, a double bond, an aromatic ring, or an ether bond), amides (such as dimethylformamide), and dioxolanes (such as 1,3-dioxolane, sulfolanes).

The non-aqueous organic solvent may be a single solvent or a mixture of solvents. When the organic solvent is a mixture, the mixture ratio of the solvents can be controlled according to the desirable battery performance.

The carbonate-based solvents may include a mixture of cyclic carbonates and linear carbonates. The cyclic carbonate and chain carbonate can be mixed in a volume ratio from 1:1 to 1:9. When such a mixture is used as an electrolyte, the electrolyte performance may enhance.

In one embodiment, the electrolyte may further include a mixture of a carbonate-based solvent and an aromatic hydrocarbon-based solvent. The carbonate-based solvents and the aromatic hydrocarbon-based solvents are preferably mixed together in a volume ratio ranging from 1:1 to 30:1.

The aromatic hydrocarbon-based organic solvent may be represented by Formula 25:

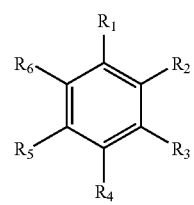

Chemical Formula 25 where, each of the $R_1$ to $R_6$ groups is independently hydrogen, halogens, C1 to C10 alkyls, C1 to C10 haloalkyls, or combinations thereof.

Nonlimiting examples of suitable aromatic hydrocarbon-based organic solvents include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4 -triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2, 4-triiodotoluene, xylene, and combinations thereof.

The non-aqueous electrolyte may further include vinylene carbonate or an ethylene-carbonate-based compound of Formula 26:

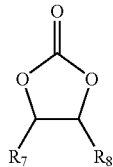

Chemical Formula 26 where, each of $R_7$ and $R_8$ is independently hydrogen, halogens, cyano (CN), nitro ($NO_2$), or C1 to C5 fluoroalkyls. In one embodiment, both $R_7$ and $R_8$ are not simultaneously hydrogen.

Nonlimiting examples of suitable ethylene carbonate-based compounds include difluoroethylene, chloroethylene, dichloroethylene, bromoethylene, dibromoethylene, nitroethylene, cyanoethylene, and fluoroethylene carbonates. The amount of each of the additives for improving the cycle-life may be adjusted within an appropriate range.

The rechargeable lithium battery may further include a separator between the negative electrode 112 and the positive electrode 114, as needed. The separator 113 separates the negative electrode 112 and the positive electrode 114, and provides a transporting path of lithium ions. Nonlimiting examples of suitable separator materials include polyethylene, polypropylene, and polyvinylidene fluoride. The separator 113 can also have a multilayer structure. Nonlimiting examples of suitable multilayer separators include polyethylene/polypropylene double-layered, polyethylene/polypropylene/polyethylene triple-layered, and polypropylene/polyethylene/polypropylene triple-layered separators.

The following examples illustrate certain embodiments of the invention. These examples, however, are presented for illustrative purpose only and are not to be interpreted as limiting the scope of the invention.

EXAMPLE 1

80 wt % of a Sn active material, 10 wt % of a polytetrafluoroethylene binder, and 10 wt % of carbon black were mixed in N-methylpyrrolidone as a solvent. A $(NH_4)_2CO_3$ pore-forming agent was added at 10 parts by weight based on 100 parts by weight of the mixture to provide a negative active material slurry. The negative active material slurry was coated on a copper foil current collector and dried at 150° C., then the pore-forming agent was removed to provide a negative active material layer.

0.6 g of a 1:2 wt/wt mixture of polyvinylalcohol (crystallinity degree 40% measured by NMR, Tg: 90° C.) and poly(methylmethacrylate-co-butylmethacrylate) (poly(MMA-co-BMA)), 0.24 g of silica (average particle diameter: 10 nm), 0.06 g of a 2:1 wt/wt lithium salt mixture of lithium imide and lithium bisoxalate borate were mixed in 25 ml tetrahydrofuran to provide a composition for forming a high-strength binder layer. The composition was screen printed on the negative active material layer and dried to provide a negative electrode for a rechargeable lithium battery having a 4 μm thick high-strength binder layer.

EXAMPLE 2

A negative active material was prepared in the same way as described in Example 1 except that $NH_4HCO_3$ was used as a pore-forming agent instead of $(NH_4)_2CO_3$.

0.6 g of polyvinyl alcohol (crystallinity degree 40% measured by NMR, Tg: 90° C.), 0.24 g of silica (average particle diameter: 10 nm), and 0.06 g of a 2:1 wt/wt lithium salt mixture of lithium imide and lithium bisoxalate borate were mixed in 25 ml of tetrahydrofuran to provide a composition for forming a high-strength binder layer. The composition was screen printed on the negative active material layer and dried to provide a negative electrode for a rechargeable lithium battery having a 3 μm thick high-strength binder layer.

EXAMPLE 3

A negative active material was prepared in the same way as described in Example 1 except that $(NH_4)_2C_2O_4$ was used as a pore-forming agent instead of $(NH_4)_2CO_3$.

A high-strength binder layer prepared in the same way as described in Example 2 except that the high-strength binder layer is 5 μm thick instead of 3 μm thick.

COMPARATIVE EXAMPLE 1

A negative electrode for a rechargeable lithium battery was prepared in the same way as described in Example 1, except that a high strength binder layer was not formed.

COMPARATIVE EXAMPLE 2

A negative active material was prepared in the same way as described in Example 1.

0.6 g of polyfluorovinylidene was mixed in 10 ml of N-methylpyrrolidone to provide a composition for forming a polymer layer. The composition was screen printed on the negative active material layer and dried to provide a negative electrode for a rechargeable lithium battery having a 4 μm thick binder layer.

Analysis of Negative Electrode

Negative electrodes of Examples 1 to 3 and Comparative Examples 1 and 2 were measured for porosity of the active material layer and mechanical strength of the high-strength binder layer. The results are shown in Table 1.

TABLE 1

|  | Porosity of active material layer (%) | Mechanical strength (MPa) |
| --- | --- | --- |
| Example 1 | 50 | 35 |
| Example 2 | 55 | 40 |
| Example 3 | 55 | 50 |
| Comparative Example 1 | 50 | — |
| Comparative Example 2 | 50 | 2 |

Battery Cell Characteristic Assessment 1

Each cell including the negative electrodes prepared according to Examples 1 and 2 and Comparative Examples 1 and 2 was measured for electrochemical characteristics (i.e. charge and discharge characteristic sand cycle-life characteristics per C-rate.) The tests are as described below.

Each negative electrode prepared according to Examples 1 and 2 and Comparative Examples 1 and 2 was used as a working electrode, a metal lithium foil was used as a counter electrode, and a porous polypropylene film separator was interposed between the working electrode and the counter electrode. 1 (mol/L) of $LiPF_6$ dissolved in a 1:1:1 vol/vol/vol mixed solvent of propylene carbonate (PC), diethyl carbonate (DEC), and ethylene carbonate (EC) as an electrolyte solution to provide a 2016 coin-type cell.

Each coin-type cell was measured to determine the capacity change with respect to the cycle number. This test is used to determine the cycle life characteristic of the electrodes. The results are shown in FIG. 3.

Each coin cell was charged to 0.005 V (vs. Li/Li+) during the charge cycle and discharged to 1.0V during the discharge cycle. The C-rate was set at a constant current of 0.5 C in the first charge and discharge cycle.

Figure 3:
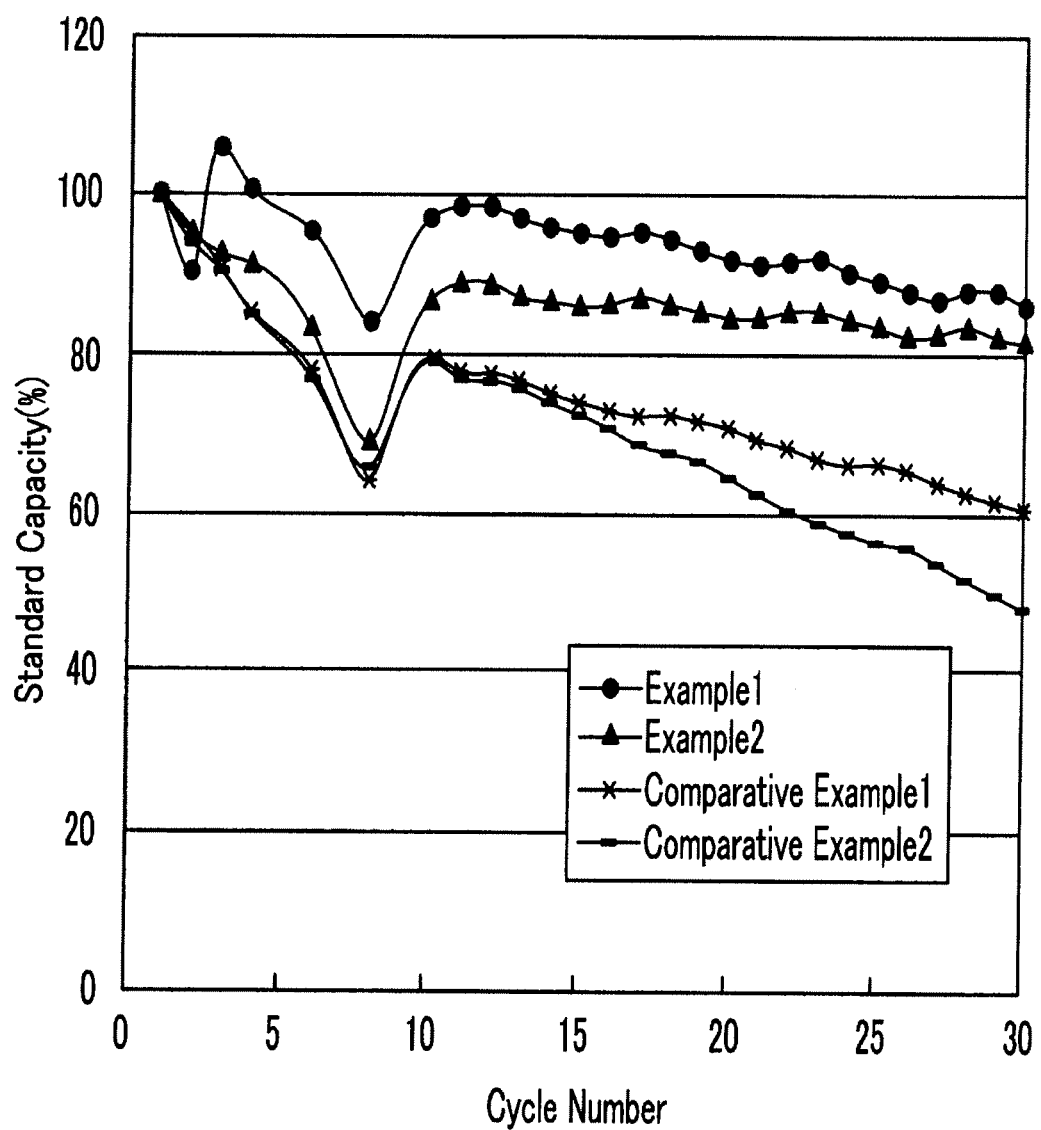
FIG. 3 depicts the cycle-life characteristics of various batteries having negative electrodes prepared according to Examples 1 and 2 and Comparative Examples 1 and 2.

FIG. 3 shows various normalized capacity curves for cells prepared using the above procedures. As shown in FIG. 3, cells that include electrodes prepared according to Example 1 and 2 have a decreasing capacity curve as the number of cycle increases. The decreasing capacity curve is even more pronounced in cells having electrodes of Comparative Examples 1 and 2. Accordingly, FIG. 3 demonstrates that the electrodes prepared according to Examples 1 and 2 have better cycle-life characteristics than those prepared according to Comparative Examples 1 and 2.

Battery Cell Characteristic Assessment 2

The coin cells prepared in the Battery Cell Characteristic Assessment 1 were then charged to 0.005 V (vs. Li/Li+) during the first charge and discharged to 1.0 V during the discharge. The C-rate was set at a constant current of 0.2 C. In the second cycle, the charge and discharge were performed until the charge and discharge cut-off potential was the same as the one in the first cycle. The C-rate was set at a constant current of 0.5 C. The cycle-life was then calculated based on the capacity ratio of the first cycle and the 30th cycle, after carrying out the charge and discharge at a constant current of 0.5 C for 30 cycles.

The negative electrode expansion rate was determined from the thickness change of the negative electrode before and after the first charge, and is calculated by Equation 1. The results are shown in Table 3.

Thickness expansion ratio (%)=[(thickness after charging-initial thickness)/initial thickness]×100   Equation 1

TABLE 2

| | 0.2 C Discharge Capacity (mAh/g) | 0.5 C Discharge Capacity (mAh/g) | 2 C Discharge Capacity (mAh/g) | Thickness Expansion Ratio (%) | 30th Discharge Capacity Retention Ratio (%) |
|---|---|---|---|---|---|
| Example 1 | 750 | 742 | 728 | 35 | 90 |
| Example 2 | 2000 | 1980 | 1940 | 45 | 82 |
| Example 3 | 1950 | 1931 | 1892 | 30 | 88 |
| Comparative Example 1 | 730 | 694 | 657 | 170 | 48 |
| Comparative Example 2 | 735 | 706 | 662 | 130 | 60 |

As shown in Table 2, the batteries of Examples 1-3 have better negative electrode expansion rate and cycle-life characteristics than those of Comparative Examples 1 and 2. The improvement in performance seems to be dependent on the porosity of the active material layer and the presence of a high-strength binder layer as each battery of Examples 1 to 3 has a porous electrode with a high-strength binder layer. The batteries of Comparative Example 1, which does not have a high-strength binder layer and that of Comparative Example 2, which has only a low-strength binder layer, have much poorer performance as compared to Examples 1 to 3.

While this invention has been described in connection with certain exemplary embodiments, it is to be understood by those of ordinary skill in the art that various modifications and changes may be made to the described embodiments without departing from the spirit and scope of the invention, which is also defined in the appended claims.

What is claimed is:

1. A negative electrode for a rechargeable lithium battery, comprising:
   a current collector;
   a porous active material layer including a metal-based active material on the current collector; and
   a high-strength binder layer comprising a high-strength binder selected from an acrylate-based polymer, a vinyl-based polymer, a fluoro-based polymer, an imide-based polymer, a cellulose-based polymer, an amideimide-based polymer, a sulfone-based polymer, an alkyleneoxide-based polymer, or a mixture thereof, wherein the high-strength binder has a crystallinity degree ranging from 10% to 70%, and the high-strength binder layer has a strength ranging from 5 to 70 MPa on the porous active material layer.

2. The negative electrode of claim 1, wherein the high-strength binder has a glass transition temperature (Tg) ranging from −100° C. to 100° C.

3. The negative electrode of claim 1, wherein the high-strength binder layer further comprises a filler.

4. The negative electrode of claim 3, wherein the filler comprises alumina, silica, zirconia, titania, or a mixture thereof.

5. The negative electrode of claim 3, wherein the filler has an average particle size ranging from 5 nm to 500 nm.

6. The negative electrode of claim 3, wherein the filler is present in an amount from 10 to 90 parts by weight based on 100 parts by weight of the high-strength binder.

7. The negative electrode of claim 1, wherein the high-strength binder layer further comprises an acryl-based polymer.

8. The negative electrode of claim 7, wherein the acryl-based polymer is present in an amount from 50 to 300 parts by weight based on 100 parts by weight of the high-strength binder.

9. The negative electrode of claim 1, wherein the high-strength binder layer further-comprises a lithium salt.

10. The negative electrode of claim 9, wherein the lithium salt comprises $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_2$, $LiAlCl_4$, $LiN(C_pF_{2p+1}SO_2)(C_qF_{2q+1}SO_2)$ (where p and q are natural numbers), $LiSO_3CF_3$, LiCl, LiI, lithium bisoxalate borate, or mixtures thereof.

11. The negative electrode of claim 9, wherein the lithium salt is present in an amount from 1 to 50 wt% based on a total weight of the high-strength binder layer.

12. The negative electrode of claim 1, wherein the high-strength binder layer has a thickness from 1 to 20 μm.

13. The negative electrode of claim 1, wherein the porous active material layer has a porosity ranging from 30 to 70 volume%.

14. The negative electrode of claim 1, wherein the metal-based active material comprises lithium metal, a metal capable of alloying with lithium, or a mixture thereof.

15. The negative electrode of claim 14, wherein the metal capable of alloying with lithium comprises Na, K, Rb, Cs, Fr, Be, Mg, Ca, Sr, Ba, Ra, Ti, Ag, Zn, Cd, Al, Ga, In, Si, Ge, Sn, Pb, Sb, Bi, or a combination thereof.

16. A rechargeable lithium battery comprising:
   a negative electrode comprising
      a current collector,
      a porous active material layer including a metal-based active material on the current collector, and a high-strength binder layer comprising a high-strength binder selected from an acrylate-based polymer, a vinyl-based polymer, a fluoro-based polymer, an imide-based polymer, a cellulose-based polymer, an amideimide-based polymer, a sulfone-based polymer, an alkyleneoxide-based polymer, or a mixture thereof, wherein the high-strength binder has a crystallinity degree ranging from 10% to 70%, and the high-strength binder layer has a strength ranging from 5 to 70 MPa on the porous active material layer;

a positive electrode; and an electrolyte.

17. The rechargeable lithium battery of claim 16, wherein the high-strength binder has a glass transition temperature (Tg) ranging from −100° C. to 100° C.

18. The rechargeable lithium battery of claim 16, wherein the high-strength binder layer further comprises a filler.

19. The rechargeable lithium battery of claim 18, wherein the filler comprises alumina, silica, zirconia, titania, or a mixture thereof.

20. The rechargeable lithium battery of claim 18, wherein the filler has an average particle size ranging from 5 nm to 500 nm.

21. The rechargeable lithium battery of claim 18, wherein the filler is present in an amount from 10 to 90 parts by weight based on 100 parts by weight of the high-strength binder.

22. The rechargeable lithium battery of claim 16, wherein the high-strength binder layer further-comprises an acryl-based polymer.

23. The rechargeable lithium battery of claim 22, wherein the acryl-based polymer is present in an amount from 50 to 300 parts by weight based on 100 parts by weight of the high-strength binder.

24. The rechargeable lithium battery of claim 22, wherein the acryl-based polymer is poly(alkyl(meth)acrylate-co-alkyl (meth)acrylate).

25. The rechargeable lithium battery of claim 16, wherein the high-strength binder layer further-comprises a lithium salt.

26. The rechargeable lithium battery of claim 25, wherein the lithium salt is present in an amount from 1 to 50 wt% based on a total weight of the high-strength binder layer.

27. The rechargeable lithium battery of claim 16, wherein the high-strength binder layer has a thickness ranging from 1 to 20 μm.

28. The rechargeable lithium battery of claim 16, wherein the porous active material layer has a porosity ranging from 30 to 70 volume%.

29. The rechargeable lithium battery of claim 16, wherein the metal-based active material comprises lithium metal, a metal capable of alloying with lithium, or a mixture thereof.

30. A negative electrode for a rechargeable lithium battery, comprising:

a current collector;

a porous active material layer including a metal-based active material on the current collector; and a high-strength binder layer comprising a high-strength binder, a filler, and poly(alkyl(meth)acrylate-co-alkyl (meth)acrylate), wherein the high-strength binder layer has a strength ranging from 5 to 70 MPa on the porous active material layer.

* * * * *